(12) United States Patent
Kucera et al.

(10) Patent No.: US 9,062,519 B2
(45) Date of Patent: Jun. 23, 2015

(54) BI-DIRECTIONAL PRESSURE EQUALIZATION VALVE

(71) Applicants: Samuel C. Kucera, Tulsa, OK (US); Anthony S. Coghill, Tulsa, OK (US)

(72) Inventors: Samuel C. Kucera, Tulsa, OK (US); Anthony S. Coghill, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 411 days.

(21) Appl. No.: 13/737,224

(22) Filed: Jan. 9, 2013

(65) Prior Publication Data

US 2014/0190704 A1 Jul. 10, 2014

(51) Int. Cl.
*E21B 34/10* (2006.01)
*F16K 17/196* (2006.01)
*F16K 31/36* (2006.01)
*G05D 7/01* (2006.01)

(52) U.S. Cl.
CPC ............ *E21B 34/101* (2013.01); *F16K 17/196* (2013.01); *F16K 31/36* (2013.01); *G05D 7/0126* (2013.01); *Y10T 137/7768* (2015.04); *Y10T 137/7775* (2015.04)

(58) Field of Classification Search
CPC ............ E21B 34/101; E21B 2034/005; E21B 2034/002; E21B 34/14; F16K 17/065; F16K 17/082; F16K 17/196; F16K 31/36; G05D 7/0126
USPC ................ 166/324, 332.7, 319, 374
See application file for complete search history.

(56) References Cited

U.S. PATENT DOCUMENTS

| | | | | |
|---|---|---|---|---|
| 3,273,649 A | * | 9/1966 | Tamplen | 166/332.7 |
| 3,941,035 A | * | 3/1976 | Mueller | 92/49 |
| 4,103,744 A | | 8/1978 | Akkerman | |
| 4,289,165 A | | 9/1981 | Fredd | |
| 4,361,075 A | * | 11/1982 | Block | 91/420 |
| 4,415,036 A | | 11/1983 | Carmody et al. | |
| 4,460,040 A | * | 7/1984 | Bowyer | 166/129 |
| 4,478,286 A | | 10/1984 | Fineberg | |
| 4,660,646 A | * | 4/1987 | Blizzard | 166/321 |
| 4,722,399 A | * | 2/1988 | Pringle | 166/324 |
| 4,844,114 A | * | 7/1989 | Moberg et al. | 137/115.21 |
| 5,346,178 A | * | 9/1994 | Baker | 251/315.14 |

(Continued)

OTHER PUBLICATIONS

International Search Report and Written Opinion, Date of Mailing Mar. 20, 2014; International Application No. PCT/US2013/074239, Korean Intellectual Property Office, International Search Report 5 pages, Written Opinon 4 pages.

(Continued)

*Primary Examiner* — Daniel P Stephenson
(74) *Attorney, Agent, or Firm* — Cantor Colburn LLP

(57) ABSTRACT

A valve for enabling communication between a first pressure and a second pressure including a piston member arranged in a housing. The piston member is movable between an open configuration and a closed configuration for selectively enabling communication between the first and second pressures. A control assembly is included for moving the valve to the open configuration. A first net pressure area is exposed to the first pressure and operatively arranged to urge the valve in a closing direction in response to the first pressure when the valve is in a closed configuration. A second net pressure area is exposed to the second pressure and operatively arranged to urge the valve in the closing direction in response to the second pressure when the valve is in a closed configuration. A method of operating a valve system is also included.

20 Claims, 1 Drawing Sheet

(56) References Cited

U.S. PATENT DOCUMENTS

| | | | |
|---|---|---|---|
| 5,609,178 A * | 3/1997 | Hennig et al. | 137/10 |
| 5,890,698 A * | 4/1999 | Domytrak | 251/1.1 |
| 6,296,061 B1 | 10/2001 | Leismer | |
| 2006/0266887 A1* | 11/2006 | Holder | 244/129.5 |
| 2009/0205836 A1* | 8/2009 | Swietlik et al. | 166/377 |
| 2009/0278064 A1* | 11/2009 | Grenaway et al. | 251/58 |
| 2011/0079394 A1 | 4/2011 | Plunkett et al. | |
| 2011/0088906 A1 | 4/2011 | Myerley | |
| 2012/0012327 A1 | 1/2012 | Plunkett et al. | |
| 2013/0306166 A1* | 11/2013 | Erb | 137/469 |
| 2014/0190704 A1* | 7/2014 | Kucera et al. | 166/374 |

OTHER PUBLICATIONS

OnePetro, [online]; [retrieved on Mar. 13, 2013]; retrieved from the Internet http://www.onepetro.org/mslib/servlet/onepetropreview?id=OTC-5576-MS, P.G.T. Mason et al., "Downhole High-Pressure Equalizing Safety Valves: A Solution-Variable Labyrinth Seals," Offshore Technology Conference, DOI 10.4043/5576-MS, ISBN 978-1-61399-080-3, 1p.

* cited by examiner

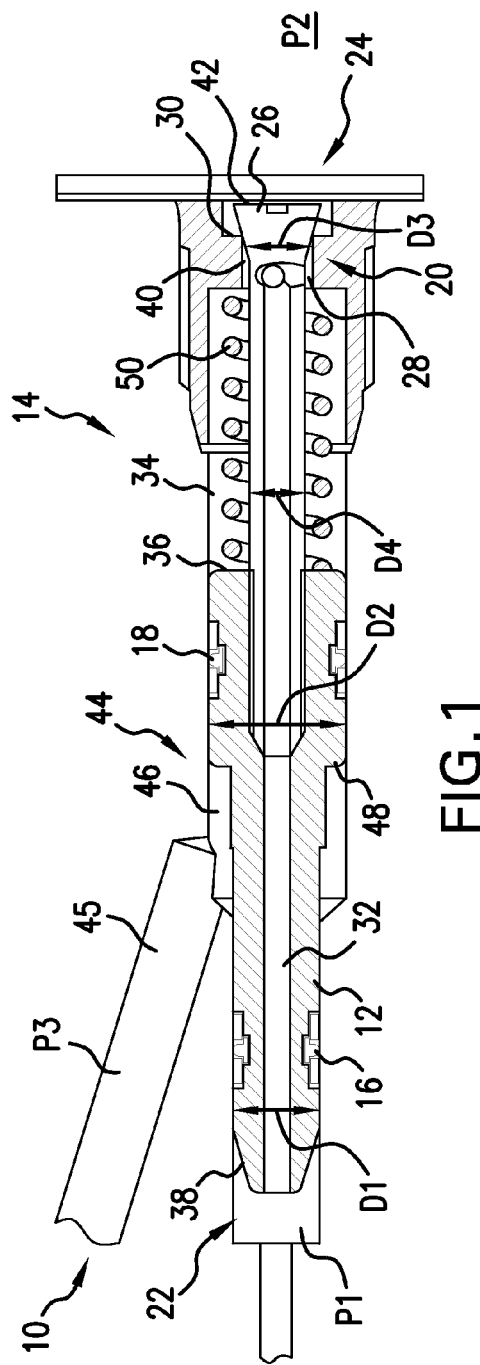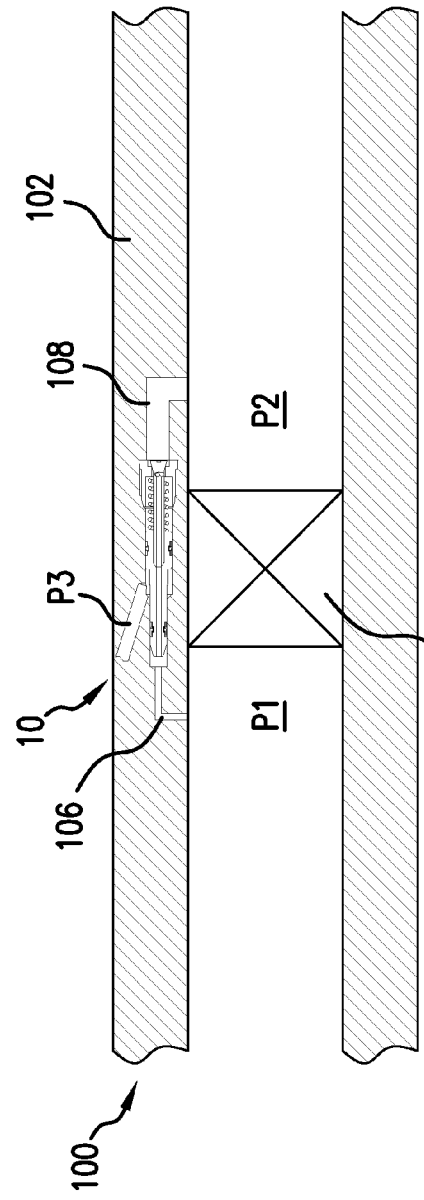

BI-DIRECTIONAL PRESSURE EQUALIZATION VALVE

BACKGROUND

Valves are ubiquitous in the downhole drilling and completions industry. As the purpose of valves is to selectively enable fluid communication through the valves, the formation of pressure differentials across valves is customary. Large differential pressures across a valve can not only affect the operation of the valve, but can result in damage to the valve due to the sudden inrush of fluid when the valve is opened. For example, ball valves are often used in the art as so-called barrier valves for at least temporarily shutting off production in a hydrocarbon well, which leads to very large pressure differentials. These large pressure differentials can result in the rotatable ball member of the valve to be pressed firmly against its housing, which causes large frictional forces between the ball and the housing and increased difficulty in opening the valve. The frictional forces and inrush of fluid to the valve when opened can cause damage to the valve such that it does not open, close and/or seal properly. Systems for equalizing pressure before opening barrier and similar valves have been developed, but the industry is always receptive of advances and alternatives in pressure equalization technology.

SUMMARY

A valve for enabling communication between a first pressure and a second pressure, including a housing; a piston member arranged in the housing, the piston member movable between an open configuration and a closed configuration for selectively enabling communication between the first and second pressures; a control assembly for moving the valve to the open configuration; a first net pressure area exposed to the first pressure and operatively arranged to urge the valve in a closing direction in response to the first pressure when the valve is in a closed configuration; and a second net pressure area exposed to the second pressure and operatively arranged to urge the valve in the closing direction in response to the second pressure when the valve is in a closed configuration.

A method of operating a valve system including exposing a first net pressure area of a piston member of a valve to a first pressure; urging the piston member in a closing direction in response to the first pressure on the first net pressure area when the valve is in a closed configuration; exposing a second net pressure area of the piston member to the second pressure; urging the piston member in the closing direction in response to the second pressure on the second net pressure area when the valve is in a closed configuration; urging the piston member in an opening direction with a control assembly; and communicating the first and second pressures with each other when the valve is in an open configuration.

BRIEF DESCRIPTION OF THE DRAWINGS

The following descriptions should not be considered limiting in any way. With reference to the accompanying drawings, like elements are numbered alike:

FIG. 1 is a cross-sectional view of a pressure equalization valve; and

FIG. 2 is a cross-sectional view of the pressure equalization valve used for equalizing pressure across a primary valve in a tubular string.

DETAILED DESCRIPTION

A detailed description of one or more embodiments of the disclosed apparatus and method are presented herein by way of exemplification and not limitation with reference to the Figures.

Referring now to FIG. 1, a valve 10 is illustrated. The valve 10 is arranged to equalize pressures, designated P1 and P2 in the Figures, from each other when the valve 10 is transitioned to an open configuration. The valve 10 includes a piston member 12 movable within a housing 14 between a closed configuration (shown in FIG. 1) that prohibits fluid communication through the valve 10 and an open configuration (when shifted to the right with respect to the orientation of FIG. 1) that enables fluid communication through the valve 10 and/or equalization of the pressures P1 and P2.

In one embodiment, the housing 14 is a wall of a tubular in a tubular string. For example, as shown schematically in FIG. 2, the valve 10 is arranged in a system 100. Specifically, the valve 10 is disposed within a wall of a tubular at least partially forming a tubular string 102. The pressures P1 and P2 are present in the string 102 on opposite sides of a primary valve 104. The valve 10 is in communication with the pressures P1 and P2 via passages 106 and 108 in the wall of the tubular string 102. In this way, the valve 10 can be arranged to equalize the pressures P1 and P2 on opposite sides of the primary valve 104, e.g., prior to the primary valve 104 being opened. The primary valve 104 could be a ball valve, a flapper valve, or any other type of valve. In one embodiment, the valve 104 is a subsurface barrier valve, a subsurface safety valve, etc., and it is to be appreciated that valves for any other selective fluid communication task or operation could be used with or for the embodiments discussed herein. Advantageously, the use of the valve 10 minimizes or eliminates the pressure differential across the primary 104, such that the primary valve 104 does not become damaged, fail to operate properly, etc., due to large pressure differentials across the primary valve 104, the sudden high pressure inrush of fluid upon opening the valve 104, etc.

Referring back to FIG. 1, the valve 10 includes a sealing arrangement configured to create various pressure areas on piston member 12 for operating the valve 10 (discussed in more detail below). Specifically, the sealing arrangement includes three sealing features 16, 18, and 20 in the illustrated embodiment. The sealing feature 16 is disposed at a first end 22 of piston member 12 that is exposed to the pressure P1. The sealing feature 18 is arranged on a radial projection of the piston member 12 to present larger pressure areas, discussed in more detail below. Both the sealing features 16 and 18 are illustrated as dynamic elastomeric seal elements, although it is to be appreciated that fluid could be sealed in other manners or with other elements. The sealing feature 20 is arranged at a second end 24 of the piston member 12 that opposite from the first end 22 and exposed to the pressure P2. The sealing feature 20 in the illustrated embodiment is a metal-to-metal seal formed by a tapered portion or poppet 26 of the piston member 12 entering a port 28 and seating against a shoulder 30 about the port 28. Again, seal elements or another manner of sealing feature could be used for or with the sealing feature 20. The sealing features 16, 18, and 20 have dimensions D1, D2, and D3, respectively.

The piston member 12 includes a fluid bypass port 32 at the first end 22 that enables fluid to bypass the sealing features 16 and 18 and enter a chamber 34. The chamber 34 is formed between the sealing features 18 and 20, and thus, the port 32 enables the pressure P1 to act on piston member 12 at both of the sealing features 18 and 20. As a result, when the valve 10 is in its closed configuration (as shown in FIG. 1), the pressure P1 acts on the piston member 12 at all three of the sealing features 16, 18, and 20. Specifically, the pressure P1 acts in the opening direction on the sealing features 16 and 20, and in the closing direction on the sealing feature 18. When in the closed configuration, the pressure P2 acts on the piston member 12 only at the sealing feature 20 in the closing direction.

It is to be appreciated that by use of the bypass port 32 and by balancing the pressure areas on the piston member 12 defined by each of the sealing features 16, 18, and 20, the valve 10 will advantageously stay closed regardless of the pressure value of the pressures P1 and P2 that are exerted on the piston member 12. Specifically, if a pressure area 36 for the sealing feature 18 in the chamber 34 (which enables the pressure P1 to act in the closing direction) is set to be greater than a sum of the pressure areas 38 and 40 corresponding the sealing features 16 and 20, respectively, (which enable the pressure P1 to act in the opening direction), then the net effect of the pressure P1 will always be in the closing direction. Alternatively stated, the valve 10 is more firmly urged in the closing direction in response to increasingly larger values of the pressure P1 and thus the valve 10 is unable to be opened by the pressure P1.

In more specificity, the pressure area 36 is determined as a difference between the areas associated with the dimension D2 and a dimension D4 of the portion of the piston member 12 extending through the chamber 34 (i.e., the area 36 is equal to $\pi((1/4)(D2)^2 - \pi((1/4)(D4)^2)$; the pressure area 38 is determined as the area of the first end 22 (including that of the port 32 due to the axial surface at the end of the port 32 that is exposed to the pressure P1), which corresponds to the dimension D1 (i.e., the area 38 is equal to $\pi((1/4)(D1)^2)$; and the pressure area 40 is determined as a difference between the areas of the piston member 12 corresponding to the dimensions D3 and the dimension D4 (i.e., the area 40 is equal to $\pi(1/4)(D3)^2 - \pi(1/4)(D4)^2$). In view of the foregoing, it is well within the capabilities of one of ordinary skill in the art to determine suitable values for the dimensions D1, D2, D3, and D4 that enable the pressure P1 to have a net force in the closing direction as discussed above.

Similarly to the pressure P1 above, since a pressure area 42 (equal to $\pi((1/4)(D3)^2)$ of the piston member 12 at the second end 24 exposed to the pressure P2 only enables the pressure P2 to act in the closing direction, the pressure P2 also cannot be used to open the valve 10. In this way, if the valve 10 is used in the system 100 of FIG. 2 in which the pressures P1 and P2 are internal tubing pressures, it can be said that the valve 10 is tubing pressure insensitive or unable to be activated by tubing pressure. Additionally, it can be said that the valve 10 is bi-directional as it is immaterial which of the pressures P1 or P2 is the greater pressure, as the valve 10 will not open due to either pressure and can equalize in either direction.

Since the valve 10 is specifically arranged to not open in response to increases in the pressures P1 and P2, the valve 10 must be opened in another manner. In the illustrated embodiment, a control assembly 44 of the valve 10 includes a control pressure line 45 that is in fluid communication with a control chamber 46 defined between the sealing features 16 and 18. A control pressure P3 can be supplied via the line 45 to the chamber 46 in order to urge the piston member 12 in the opening direction in order to open the valve 10 and enable equalization of the pressures P1 and P2. That is, when shifted to the open configuration, the poppet 26 unseats from the shoulder 30, thereby opening the chamber 34 and the port 32 to the pressure P2. The port 32 provides communication between the pressures P1 and P2, thereby enabling the pressures P1 and P2 to equalize.

In order to return the valve 10 to the closed configuration and counteract hydrostatic pressure in the line 45, a biasing or spring member 50 can be included to urge the piston member 12 in the closed direction. The biasing member 50 could be any resilient, spring-like, or elastically deformable member arranged to return the valve 10 to its closed configuration. The line 45 could, for example, extend to surface to enable operators to pump a pressurized fluid downhole for controlling the operation of the valve 10. The control line 45 could be equipped with a relief or bleed off valve in order to relieve the hydrostatic pressure in the control line 45, which can be substantial if the valve 10 is positioned hundreds of feet downhole in a borehole system.

The pressure P3 acts on a pressure area 48 of the member 12 defined as a difference between the areas associated with the dimensions D2 and D1 (i.e., the area 48 equal to $\pi(1/4)(D2)^2 - \pi(1/4)(D1)^2$). The pressure areas 36, 38, 40, and 42 are determinable as noted above. Thus, with knowledge of the pressures P1 and P2 (or expected ranges for the pressures P1 and P2), of the dimensions D1, D2, D3, and D4, and the characteristics of the biasing member 50, one can relatively accurately determine the pressure P3 needed to open the valve 10. Advantageously, the control pressure P3 can be tied to the control scheme used for actuating the primary valve 104 in the system 100 of FIG. 2. That is, for example, the control line 45 could supply hydraulic pressure to both the primary valve 104 and the valve 10. By setting the estimated pressure to open the valve 10 to be less than that required to open the primary valve 104, the equalization valve 10 automatically opens and equalizes pressure before the primary valve 104 opens. Furthermore, operators controlling operation of the valve do not need to perform any additional steps, as the valve 10 will automatically open before the primary valve 104 does. Of course, the control assembly 44 could alternatively include any device, mechanism, member, element, or combinations thereof that enable a net force to be exerted on the piston member 12 in the opening direction. Instead of the hydraulic embodiment illustrated, the control assembly could be any combination of magnetic, mechanical, electrical, etc. For example, the control assembly 44 could include one or more electromagnets, a lead screw, a linear motor, etc., which could be supplied with power from an electrical cable replacing the control line 45. Regardless of control scheme, the operation of the valve 10 can be tied to the operation of the primary valve 104, such that the equalization valve always actuates with, preferably before, the primary valve 104.

It is to be appreciated that any number of modifications could be made to the valve 10 or the system 100 while staying within the scope of the claims. For example, in one embodiment two of the valves 10 could be utilized in a modification of the systems 100, with the valves facing each other such that tubing pressure from both sides (P1 and P2) is only applied to metal-to-metal contact at the sealing feature 20, thereby preserving the dynamic seals (e.g., the sealing features 16 and 18). Additionally, the fluid passages 106 and 108 could be equipped with filters or screens for removing any undesirable solids, e.g., sand or debris, from disrupting operation of the valve 10 in the system 100.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A valve for enabling communication between a first pressure and a second pressure, comprising:
   a housing;
   a piston member arranged in the housing, the piston member movable between an open configuration and a closed configuration for selectively enabling communication between the first and second pressures;
   a control assembly for moving the valve to the open configuration;
   a first net pressure area exposed to the first pressure and operatively arranged to urge the valve in a closing direction in response to the first pressure when the valve is in a closed configuration; and
   a second net pressure area exposed to the second pressure and operatively arranged to urge the valve in the closing direction in response to the second pressure when the valve is in a closed configuration.

2. The valve of claim 1 further comprising a first sealing feature proximate a first end of the piston member at least partially defining the first net pressure area, a second sealing feature proximate to a second end of the piston member at least partially defining the second net pressure area, and a third sealing feature located intermediately between the first and second sealing features, each of the first, second, and third sealing features operatively arranged for enabling the piston member to be sealed with respect to the housing.

3. The valve of claim 2, further comprising a bypass port from the first end of the piston member to a chamber formed between the housing and the second and third sealing features.

4. The valve of claim 3, wherein the third sealing feature with respect to the chamber at least partially define the first net pressure area, with the first pressure acting in the closing direction against the third sealing feature due to the bypass port bypassing to an opposite side of the third sealing feature from the first end of the piston member.

5. The valve of claim 3, wherein the first pressure acts on the first end of the piston member and the second and third sealing features via the chamber to define the first net pressure area, and the second pressure acts solely on the second pressure feature at the second end to define the second pressure area.

6. The valve of claim 3, wherein the control assembly includes a control chamber that is formed between the housing and the first and third sealing features, the third sealing feature with respect to the control chamber at least partially defining a third net pressure area of the piston member.

7. The valve of claim 6, wherein the control assembly further comprises a control line operatively arranged for supplying a third pressure to the control chamber and the third net pressure area.

8. The valve of claim 1, further comprising a biasing member for urging the piston member in the closing direction.

9. A system including:
   a valve according to claim 1; and,
   a primary valve, the primary valve exposed to the first pressure on one side thereof and to the second pressure on another side thereof.

10. The system of claim 9, further comprising a tubular string housing the valve and the primary valve, wherein the first and second pressures are tubing pressures.

11. The system of claim 10, wherein the primary valve is a barrier valve.

12. The system of claim 9, wherein the control assembly also controls operation of the primary valve.

13. The system of claim 9, wherein the control assembly includes a control chamber, the control chamber formed between the housing and the first and third sealing features, the third sealing feature with respect to the control chamber at least partially defining a third net pressure area of the piston member.

14. The system of claim 13, further comprising a control line operatively arranged to supply a third pressure to the control chamber and the primary valve for enabling operation of both the valve and the primary valve with the third pressure.

15. A method of operating a valve system comprising:
   exposing a first net pressure area of a piston member of a valve to a first pressure;
   urging the piston member in a closing direction in response to the first pressure on the first net pressure area when the valve is in a closed configuration;
   exposing a second net pressure area of the piston member to the second pressure;
   urging the piston member in the closing direction in response to the second pressure on the second net pressure area when the valve is in a closed configuration;
   urging the piston member in an opening direction with a control assembly; and
   communicating the first and second pressures with each other when the valve is in an open configuration.

16. The method of claim 15, wherein the valve is disposed with a primary valve, the primary valve exposed to the first pressure on one side thereof and to the second pressure on another side thereof, the method further comprising opening the primary valve after opening the valve.

17. The method of claim 16, wherein the control assembly opens both the valve and the primary valve.

18. The method of claim 16, wherein urging the valve in the opening direction includes supplying a third pressure to a third net pressure area of the piston member.

19. The method of claim 15, wherein the valve comprises a first sealing feature proximate a first end of the piston member at least partially defining the first net pressure area, a second sealing feature proximate to a second end of the piston member at least partially defining the second net pressure area, and a third sealing feature located intermediately between the first and second sealing features, each of the first, second, and third sealing features operatively arranged for enabling the piston member to be sealed with respect to a housing.

20. The method of claim 19, wherein exposing the first net pressure area to the first pressure includes communicating fluid via a bypass port in the piston member to a chamber formed between the second and third sealing features, the first net pressure area at least partially defined by the third sealing feature with respect to the chamber.

* * * * *